(12) United States Patent
Freitag et al.

(10) Patent No.: US 6,543,783 B1
(45) Date of Patent: Apr. 8, 2003

(54) SEALING RING WITH SLOPING SUPPORT BODY

(75) Inventors: Edgar Freitag, Schwalmstadt (DE); Günter Bergmann, Heddesheim (DE)

(73) Assignee: Firma Carl Freudenberg, Weinheim (DE)

( * ) Notice: Subject to any disclaimer, the term of this patent is extended or adjusted under 35 U.S.C. 154(b) by 298 days.

(21) Appl. No.: 09/031,186

(22) Filed: Feb. 26, 1998

(30) Foreign Application Priority Data

Feb. 26, 1997 (DE) .......................... 197 07 652

(51) Int. Cl.⁷ ................ F16J 9/20; F16J 15/32
(52) U.S. Cl. ............. 277/436; 277/437; 277/549; 277/560; 277/562
(58) Field of Search ................ 277/436, 437, 277/549, 560, 562, 565, 572

(56) References Cited

U.S. PATENT DOCUMENTS 4,298,203 A  *  11/1981  Holzer ................ 277/560
4,410,190 A  *  10/1983  Potter ................ 277/565
4,504,068 A  *  3/1985  Holzer ................ 277/560

FOREIGN PATENT DOCUMENTS

DE        393 7896        5/1991

* cited by examiner

Primary Examiner—Anthony Knight
Assistant Examiner—Enoch Peavey
(74) Attorney, Agent, or Firm—Kenyon & Kenyon

(57) ABSTRACT

A sealing ring having a sealing body with a dynamically stressed sealing lip made of an elastomeric material which at least partially surrounds a toroidal supporting body. The supporting body has a slope facing the sealing lip, and the sealing body has a dynamically stressed sealing bulge which is adjacent with an axial distance on the side of the sealing lip facing away from the space to be sealed. The sealing bulge is in contact with the face to be sealed under an initial elastic stress. The sealing bulge is arranged axially between two radial planes which axially delimit the slope.

9 Claims, 2 Drawing Sheets

SEALING RING WITH SLOPING SUPPORT BODY

TECHNICAL FIELD OF THE INVENTION

The invention relates to a sealing ring, comprising a sealing body with a dynamically stressed sealing lip made of an elastomeric material which at least partially encloses a toroidal supporting body, with the supporting body having a slope facing the sealing lip. The sealing body has a dynamically stressed sealing bulge which is adjacent to it with an axial distance on the side facing away from the space to be sealed and which is in contact with the area to be sealed under an initial elastic stress.

BACKGROUND OF THE INVENTION

One example of a sealing ring of the general type to which this invention is directed is disclosed in German Patent DE 39 37 896 A1. That sealing ring is designed as a lip seal gasket, with the sealing body and the supporting body force-locked together. The supporting body is arranged inside the sealing body and should prevent radial expansion of the sealing body past the supporting body and a resulting radial shearing of the sealing body away from the supporting body.

SUMMARY OF THE INVENTION

The object of this invention is to improve on a sealing ring of this type so that the sealing ring has improved use properties and a longer service life. To that end, the sealing ring has a sealing bulge that particularly enhances the sealing properties of the device.

This object is achieved by arranging the sealing bulge between the two radial planes in the axial direction which bound the slope of the torroidal sealing body. It is advantageous that the sealing bulge be axially supported by the sloped portion of the supporting body in the area of its contact point with the face to be sealed. The support of the sealing bulge by the slope and its elastic adaptation to the face to be sealed are almost constant during the entire useful life of the sealing ring. The design of the supporting body and its association with the sealing bulge have the effect that the elastomeric material is not exposed to any bending moments, compression and/or tensile stresses in the area of the sealing bulge which would reduce its service life. Due to the fact that the sealing bulge is covered by the slope of the supporting body in the axial direction, there is a great dissipation of stress within the elastomeric material in the area of the slope—compared to supporting bodies without a slope on the side facing the sealing lip—so that shearing away or detachment of the elastomeric material from the supporting body is reliably prevented. The dissipation of stress also affects the bonding layer between the elastomeric material and the supporting body.

According to one advantageous embodiment, the ratio of the width of the slope to the width of the supporting body is 0.2 to 0.7, preferably 0.3 to 0.5. It is advantageous here that with such a ratio, good support and guidance of the sealing bulge and an adequately great dissipation of stress within the elastomeric material in the area of the slope are achieved.

The stresses within the elastomeric material are greater when a traditional supporting body, which is largely rectangular in shape in the area of the sealing bulge, is employed, as in the prior art, than with a design having a slope as set forth here.

According to a first embodiment, the slope may be designed as a chamfer. The chamfer may have an angle $\alpha$ of 20° to 45°, preferably 30° to 45°, with respect to the axis. Such a chamfer can be produced easily and inexpensively from the point of view of the manufacturing technology.

According to another embodiment, the slope may be designed as an arch curved in the direction of the sealing lip. The stresses are largely uniformly distributed along the arch and are at most approximately two-thirds as great in comparison with a slope designed as a chamfer.

All the edges of the supporting body enclosed by the elastomeric material are preferably rounded, with the edges each having a radius of at least 0.3 mm. It is advantageous here that stress peaks within the elastomer sealing body in the area of the edges of the supporting body are minimized. The danger of detachment of the elastomeric material from the supporting body, which is made of a tough hard material, e.g., a metallic material, is thus further reduced.

The side of the supporting body facing toward the face to be sealed may form an angle $\beta$ of 5° to 20°, preferably 7° to 15° with the axis, and the first end face turned away from the sealing lip may be brought closer to the surface to be sealed than the second end face which faces the sealing lip. Such an embodiment contributes to a further reduction in stresses in the elastomeric material of the sealing ring regardless of whether the slope is designed as a chamfer or as an arch. With regard to achieving the most uniform possible distribution of stresses within the elastomeric material, it is advantageous that changes in direction in the surface of the supporting body take place as gradually as possible and with the largest possible radii.

In cross section, the sealing body has a trapezoidal enlargement between the radial planes axially in the direction of the sealing lip. Due to the trapezoidal transition of the elastomeric material of the sealing bulge in the direction of the sealing lip, the cross section of the sealing body increases steadily. The service life of the sealing ring is further improved due to the fact that there is no reduction in cross section.

The side of the sealing body facing the surface to be sealed preferably forms an angle $\chi$ of 5° to 15°, and preferably 7° to 10° with respect to the axis, from the end face which is turned axially away from the sealing lip to the sealing bulge, with the surface to be sealed and the sealing body bordering a wedge-shaped gap that tapers from the end face in the direction of the sealing bulge. Such a design yields a good return flow of the medium to be sealed used to lubricate the sealing lip and the sealing bulge in the direction of the space to be sealed with a translational movement of the surface to be sealed relative to the sealing ring.

The sealing lip and the sealing bulge are each preferably bordered by two intersecting conical surfaces, with the conical surfaces facing the space to be sealed forming a larger angle with the axis than do the conical surfaces facing away from the space to be sealed. According to the effect of the angle $\chi$ described above, excellent sealing of the space to be sealed is achieved with such an embodiment of the sealing lip and sealing bulge with machine parts moving with a translational movement relative to one another. Furthermore, good lubrication of the sealing lip and sealing bulge is achieved. The medium to be sealed, which serves to lubricate the sealing lip and sealing bulge, is returned to the space to be sealed with the back and forth movement of the machine parts due to the shallow angle of the conical faces that face away from the space to be sealed.

The sealing ring according to the invention is preferably designed as a lip seal for sealing two machine parts such as gear pistons that are engaged in a translational movement relative to one another. The sealing lip may be arranged in a groove that is open to the outside in a rod, depending on the respective application, and a casing which surrounds the rod radially on the outside comes in contact with its sealing lip and the sealing bulge under an initial elastic stress. According to another embodiment, it is possible for the sealing ring to be arranged in a groove which is open toward the inside radially in a casing and to surround and seal with its sealing lip and the sealing bulge a rod guided through the casing.

DETAILED DESCRIPTION OF THE INVENTION

Figure 1:
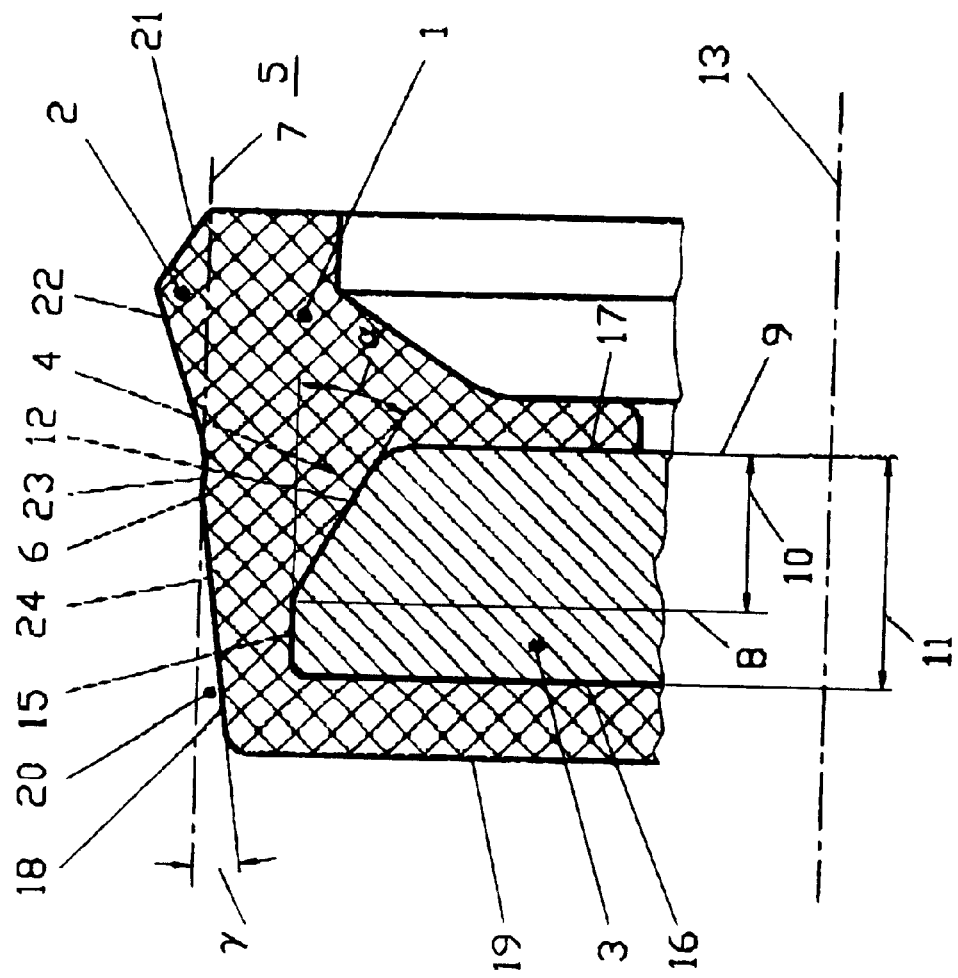
FIG. 1 is a partial cross-sectional view of a first embodiment of a sealing ring constructed according to the principles of the invention. The sealing ring is designed as a lip seal and is arranged in a groove which is open to the outside radially in a rod and has a supporting body which has a slope in the form of a chamfer facing the sealing lip.
Figure 2:
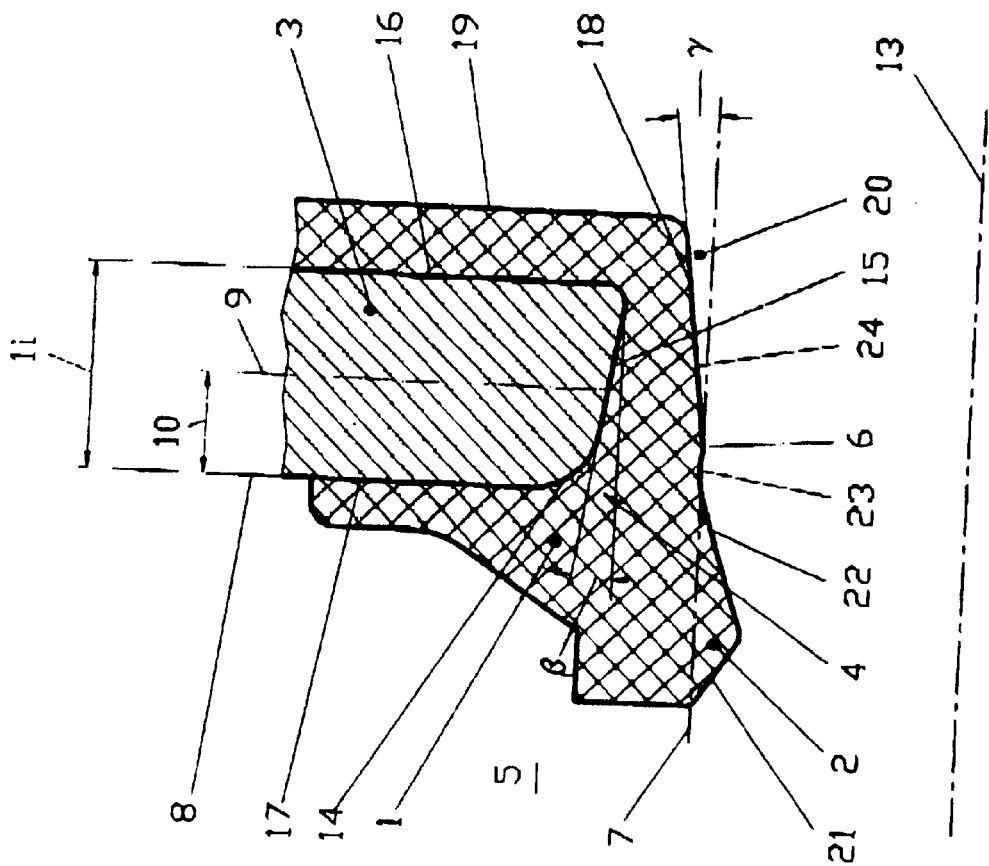
FIG. 2 is a partial cross-sectional view of a second embodiment where the sealing ring is designed as a lip seal, arranged in a groove which is open toward the inside radially in a casing, and surrounds and seals the rod guided through the casing. The supporting body is provided with a slope in the form of an arch facing the sealing lip.

FIGS. 1 and 2 each show a sealing ring designed as a lip seal. However, the sealing rings according to this invention may also be parts of a finished piston. (In both FIGS. 1 and 2, the sealing ring is shown in the uninstalled state to facilitate their description.) The sealing ring in FIGS. 1 and 2 comprises a sealing body 1 and a toroidal supporting body 3. Sealing body 1 is made of an elastomeric material and is provided with a dynamically stressed sealing lip 2 and a sealing bulge 6 which is also dynamically stressed, with sealing lip 2 and sealing bulge 6 in this embodiment being made of the same material and designed in one piece. (This unitary construction simplifies the manufacture of the device.) Supporting body 3 is made of a tough and hard material, namely a metal in this example, and is seen in FIG. 1 to have a first end face 16, a side 15, a slope 4 facing sealing lip 2, and a second end face 17. Sealing bulge 6 is arranged on the side of sealing lip 2 facing away from space 5 to be sealed, with both sealing lip 2 and sealing bulge 6 coming in tight contact with the surface 7 to be sealed, which undergoes a translational back-and-forth movement in relation to the sealing ring.

Slope 4 is axially delimited on its sides by two imaginary radial planes 8 and 9, with sealing bulge 6 arranged axially between the two radial planes 8 and 9.

In the embodiments shown here, the ratio of width 10 of slope 4 to width 11 of supporting body 3 is 0.5, with sealing bulge 6 arranged axially in the middle between radial planes 8, 9.

In the embodiment shown in FIG. 1, the sealing lip 2 and sealing bulge 6 are arranged on the outside radially and are in tight contact under an initial elastic stress with a surface 7 to be sealed, indicated here schematically, which is part of a casing. The sealing ring itself is arranged in a groove which is open in the direction of surface 7 to be sealed in a rod, with the casing and the rod undergoing a translational movement relative to one another. In this embodiment, slope 4 is designed as chamfer 12 and forms an angle α of 30° to axis (of the rod and bore in the casing) 13.

FIG. 2 shows slope 4 as an arch 14 curved in the direction of sealing lip 2, with side 15 of supporting body 3 that faces surface 7 to be sealed forming an angle β of 7° to axis 13. The smoothest possible transition in the geometry of supporting body 3 is of crucial importance for an efficient dissipation of stress in the elastomeric material of sealing body 1. Due to the large radius of arch 14 and due to side 15 of supporting body 3 running at angle β, the sealing body has only minor internal stresses, so that mechanical overstressing and a resulting detachment of the elastomeric material from the supporting body and/or shearing of sealing lip 2 away from supporting body 3 can be reliably prevented.

In both embodiments, the edges of supporting body 3 which are enclosed by the elastomeric material of sealing body 1 are rounded to prevent notching effects and mechanical overstressing in the elastomeric material of the sealing body.

The advantageous arrangement of sealing bulge 6 between the two radial planes 8, 9 has the effect of minimizing the mechanical stresses of the dynamically stressed sealing body 1 during the intended use of the sealing ring, which helps provide the sealing ring with consistently good use properties over a long service life. The geometry of the sealing body also significantly contributes to the good use properties and the good durability of the sealing ring. Between radial planes 8, 9, the cross section of sealing body 1 has a trapezoidal enlargement in the direction of sealing lip 2 to yield a long service life.

In each of the illustrated embodiments, the side 18 of the sealing body 1 facing the surface 7 to be sealed forms an angle χ of 5° to 15° with respect to the axis 13 from the end face 19, which is turned away from the sealing lip 2 axially to the sealing bulge 6. The surface 7 to be sealed and the sealing body 1 delimit a wedge-shaped gap 20 which tapers from the end face 19 in the direction of the sealing bulge 6.

Also in each of the embodiments, the sealing lip 2 and the sealing bulge 6 are each delimited by two intersecting conical surfaces 21,22; and 23, 24. The conical surfaces 21, 23 facing the space 5 to be sealed form a larger angle with the axis 13 than the conical surfaces 22, 24 facing away from the space 5 to be sealed.

Elastomeric materials such as NBR and ACM and/or thermoplastic elastomers such as polyurethane are the preferred material for sealing body 1.

What is claimed is:

1. A sealing ring comprising:
a toroidal supporting body having a longitudinal axis, and
   a sloped portion set at an angle with respect to the axis, the sloped portion of the supporting body being bound by two radial planes which define the axial extent of the sloped portion;
a sealing body comprising a dynamically stressed sealing lip, the sealing body being made of an elastomeric material which at least partially encloses the supporting body, wherein the sloped portion of the supporting body is in contact with the sealing body such that the surface of the sloped portion of the supporting body that is in contact with the sealing body faces in a direction towards the sealing lip, and the sealing body having a dynamically stressed sealing bulge on the side of the sealing lip facing away from a space to be sealed, said sealing bulge coming in tight contact with the surface to be sealed under an initial elastic stress, wherein the sealing bulge is arranged between the two radial planes in the axial direction.

2. A sealing ring as set forth in claim 1, wherein the ratio of the width of the sloped portion to the width of the supporting body is 0.2 to 0.7.

3. A sealing ring as set forth in claim 1, wherein the sloped portion forms an angle $\alpha$ of 20° to 45° with respect to the axis.

4. A sealing ring as set forth in claim 1, wherein the sloped portion of the supporting body includes, at an end closest to the sealing lip in the axial direction, a region having a gradually increasing slope that forms an arch.

5. A sealing ring as set forth in claim 1, wherein all the edges of the supporting body which are enclosed by the elastomeric material are rounded, and the edges each have a radius of at least 0.3 mm.

6. A sealing ring as set forth in claim 1, wherein a side of the supporting body facing the surface to be sealed forms an angle $\alpha$ of 5° to 20° with the axis, and a first end face turned away from the sealing lip is closer to the surface to be sealed than a second end face facing the sealing lip.

7. A sealing ring as set forth in claim 1, wherein the cross section of the sealing body has a trapezoidal enlargement between the radial planes in the direction of the sealing lip.

8. A sealing ring as set forth in claim 1, wherein the side of the sealing body facing the surface to be sealed forms an angle $\chi$ of 5° to 15° with the axis from an end face which is turned away from the sealing lip axially to the sealing bulge, and the surface to be sealed and the sealing body delimit a wedge-shaped gap which tapers from the end face in the direction of the sealing bulge.

9. A sealing ring as set forth in claim 1, wherein the sealing lip and the sealing bulge are each delimited by two intersecting conical surfaces, and the conical surfaces facing the space to be sealed form a larger angle with the axis than the conical surfaces facing away from the space to be sealed.

* * * * *